(12) United States Patent
Fillbrandt et al.

(10) Patent No.: US 9,148,559 B2
(45) Date of Patent: Sep. 29, 2015

(54) DEVICE FOR ASSISTING FOCUSING OF A CAMERA

(75) Inventors: Holger Fillbrandt, Bad Salzdetfurth (DE); Jan Karl Warzelhan, Bad Salzdetfurth Ot Heinde (DE)

(73) Assignee: Robert Bosch GmbH, Stuttgart (DE)

( * ) Notice: Subject to any disclaimer, the term of this patent is extended or adjusted under 35 U.S.C. 154(b) by 185 days.

(21) Appl. No.: 13/817,220

(22) PCT Filed: Aug. 15, 2011

(86) PCT No.: PCT/EP2011/064029
§ 371 (c)(1),
(2), (4) Date: May 27, 2013

(87) PCT Pub. No.: WO2012/022713
PCT Pub. Date: Feb. 23, 2012

(65) Prior Publication Data
US 2013/0235254 A1    Sep. 12, 2013

(30) Foreign Application Priority Data

Aug. 18, 2010 (DE) .......................... 10 2010 039 431

(51) Int. Cl.
*H04N 5/232* (2006.01)
*G03B 3/12* (2006.01)
*G03B 13/32* (2006.01)

(52) U.S. Cl.
CPC .............. *H04N 5/23212* (2013.01); *G03B 3/12* (2013.01); *G03B 13/32* (2013.01); *H04N 5/23293* (2013.01)

(58) Field of Classification Search
CPC ........... H04N 5/23293; H04N 5/23212; G03B 13/32; G03B 3/12

USPC .......................................................... 348/346
See application file for complete search history.

(56) References Cited

U.S. PATENT DOCUMENTS

| 4,597,659 | A | 7/1986 | Suda et al. | |
|---|---|---|---|---|
| 6,937,284 | B1 * | 8/2005 | Singh et al. | 348/346 |
| 2003/0174230 | A1 * | 9/2003 | Ide et al. | 348/345 |
| 2008/0116353 | A1 | 5/2008 | Nattress | |
| 2009/0231454 | A1 * | 9/2009 | Miura | 348/220.1 |
| 2011/0273577 | A1 * | 11/2011 | Saito | 348/222.1 |
| 2014/0002716 | A1 * | 1/2014 | Yamada et al. | 348/346 |

FOREIGN PATENT DOCUMENTS

| DE | 2361286 | 6/1975 |
|---|---|---|
| DE | 69207043 | 9/1996 |
| EP | 0508897 | 12/1995 |
| EP | 2048877 | 4/2009 |
| WO | 2008063811 | 5/2008 |

OTHER PUBLICATIONS

International Search Report for Application No. PCT/EP2011/064029 dated Nov. 28, 2011 (3 pages).

* cited by examiner

*Primary Examiner* — James Hannett
(74) *Attorney, Agent, or Firm* — Michael Best & Friedrich LLP

(57) ABSTRACT

A device assists focusing of a camera that is equipped with a manual focus-adjusting unit and that provides digital image contents, such as a smart camera. The device is configured to determine a focus value of the camera depending on an operation of the manual focus-adjusting unit and to display focusing information on the basis of the determined focus value to a user.

12 Claims, 3 Drawing Sheets

DEVICE FOR ASSISTING FOCUSING OF A CAMERA

BACKGROUND OF THE INVENTION

The present invention relates to a device for assisting focusing of a camera, equipped with a manual focusing apparatus, for providing digital image contents, more particularly a smart camera, a camera equipped with such a device and a method for providing focusing information.

"Smart cameras" are understood to mean optical systems which are able not only to record images but also to process and/or interpret these independently. By way of example, in addition to an image recording circuit, a smart camera can, as intelligent and autonomous optical system, also filter out and process application-specific information from recorded images and make decisions based thereon.

Smart cameras, which are often utilized within the scope of monitoring objects, generally consist of a camera housing with a video processing unit (video content analysis) and a removable lens. Depending on the application, use can be made of different lenses (wide-angle, telephoto or zoom lenses). After a new lens has been mounted, the latter generally needs to be focused manually. In the case of a smart camera, the latter is, for this purpose, usually connected to a computer (e.g. a notebook) via a network connection, for example via Ethernet or WLAN. The camera image can subsequently be observed on the notebook while the lens is set to have the best focus.

A focusing apparatus, which can be used in such smart cameras, or a recording lens with a changeable focal length is disclosed in e.g. DE 23 61 286 A1. Automatic methods for motorized focusing of a lens (i.e. autofocus methods) are known from DE 692 07 043 T2 and EP 0 508 897 B1, for example. However, in the case of monitoring objects, in which use is made of fixedly installed, static cameras, more cost-effective lenses without autofocus functionality are preferred. Here, manual lenses are therefore particularly advantageous as a result of the fact that the lens is generally only set once during the installation of a camera, and subsequently remains unchanged in terms of the focus position.

When focusing a smart-camera system in which an external display of the camera image, for example on a notebook, is used in order to set a precisely sharp focus, it is necessary to observe the screen continuously in order to obtain the best sharpness result. However, in situations in which the camera is mounted at large distances, for example at great heights on ceilings or other points that are difficult to access, it is hardly possible to appraise the camera image and simultaneously adjust the lens. Such situations often present no option for placing down a computer, e.g. a notebook, within viewing distance of the camera.

There therefore is a need for apparatuses for assisting focusing of corresponding cameras, in particular smart cameras, which apparatuses can be used on cameras which merely have a manual focusing apparatus.

SUMMARY OF THE INVENTION

Against this backdrop, the present invention proposes a device for assisting focusing of a camera, equipped with a manual focusing apparatus, for providing digital image contents, more particularly a smart camera, a camera equipped with such a device and a method for providing focusing information for focusing such a camera.

Advantages of the Invention

As a result of the measures according to the invention, manual focusing, for example on a smart camera, is simplified and significantly accelerated. By way of example, to this end, a microprocessor present in the smart camera is used for analyzing the sharpness of the image. By way of example, one or more light-emitting diodes on the camera signal the status of the focusing process and provide a user feedback in respect of a focus position or focusing. Advantageously, it is also possible within the scope of the invention for there to be acoustic signaling or large-area visualization directly in the camera image such that the sharpness status of the camera can be identified even if the notebook has been set-up at a distance (e.g. within the scope of a conventional camera-setting method). In the latter case, it should be considered to be advantageous that no additional hardware is required in this case; however, an external image display continues to be required.

A microprocessor generally operates within corresponding smart cameras, said microprocessor analyzing the video data provided by the camera and extracting further information (e.g. within the scope of movement detection). This microprocessor is used during a focusing process to monitor the focus of the camera image. To this end, suitable image processing routines are implemented on the smart camera, as will be explained in more detail below. The corresponding algorithms or processing routines only require low storage capacities and calculation capabilities on the smart camera and can, to the extent that these are not only loaded in the installation mode (i.e. for setting a corresponding camera under specific conditions), also be used for other applications.

The results of an analysis undertaken by the microprocessor are signaled by means of light-emitting diodes, as mentioned, on the housing and/or acoustically in the housing and/or written onto or superposed into a camera image in the form of an on-screen functionality.

A substantial advantage of the measures proposed according to the invention lies in a simplification of a focusing process in order, irrespective of the restricted indication possibilities, to ensure pinpoint setting of the lens.

Further advantages and embodiments of the invention emerge from the description and the attached drawing.

It is understood that the features mentioned above and those yet to be explained below can be used not only in the respectively specified combination, but also in other combinations or on their own, without departing from the scope of the present invention.

The invention is illustrated schematically in the drawing on the basis of exemplary embodiments and is described in great detail below with reference to the drawing.

DETAILED DESCRIPTION

Figure 1:
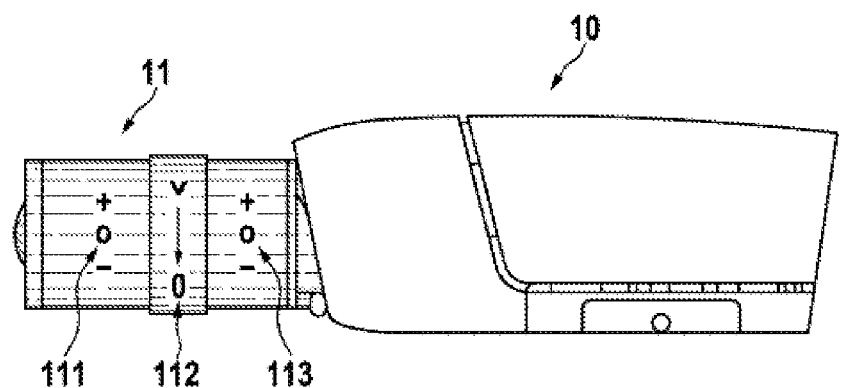
FIG. 1 shows a smart camera, as is used within the scope of the present invention.

FIG. 1 illustrates a smart camera, as can be used within the scope of a method according to the invention.

The camera has a camera housing 10 and a lens 11. The camera is connected to an external evaluation and/or indication apparatus (not illustrated) by means of connection means (likewise not illustrated), which can also be embodied in the form of a WLAN apparatus or other wireless transmission devices. A corresponding camera usually comprises a focusing wheel 111, which is used to set the camera focus, an iris-diaphragm setting mechanism 112 and a setting apparatus for changing a focal length 113 (zoom setting).

Figure 2:
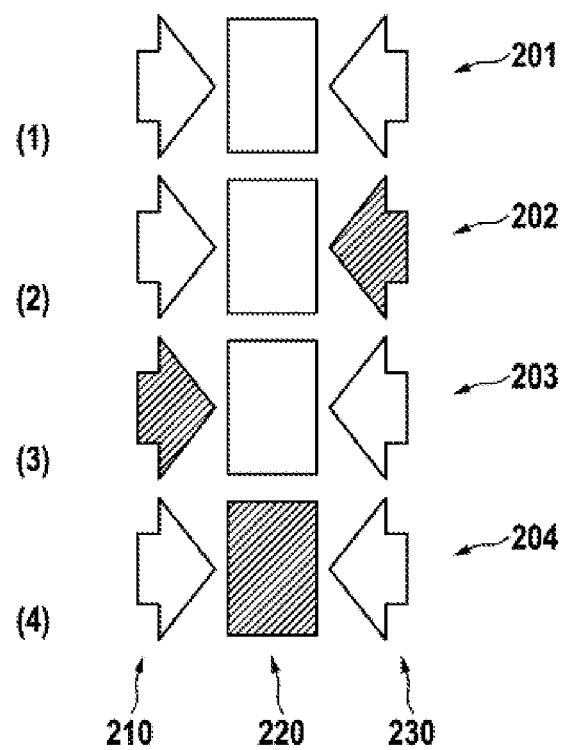
FIG. 2 shows means for indicating focusing information as per a particularly preferred embodiment of the invention.

Means for indicating focusing information as per a particularly preferred embodiment of the invention are illustrated in FIG. 2 and denoted by 201 to 204 in four different indication states, which correspond to focusing information.

By way of example, corresponding indication means have transparent regions 210, 220, 230, behind which there are light-emitting diodes (LEDs) in each case. None of the indicators 210, 220, 230 light up in a switched-off state 201. In a second setting mode, the lighting-up of an arrow (shaded in the figure) indicates to the user that a focus wheel 111 of a corresponding camera (cf. FIG. 1) needs to be turned in a first direction, for example to the right. If, as a result of the means provided according to the invention for determining the focus value, a rotation of the focus wheel in the opposite direction is identified as being necessary, this is signaled to the user in the indication state 203 by the lighting-up of an opposite arrow 210. If a sharpness value has been reached, for example above a threshold which has been automatically increased gradually, this is indicated to the user in this case by the lighting-up of a rectangle 220.

As a result, a cost-effective signal output device in the form of one or more light-emitting diodes is provided, which can also be assisted and/or replaced by an acoustic signaling device. Furthermore, there can, additionally or alternatively, be a corresponding on-screen visualization. Visual signaling, as illustrated in FIG. 2, can also be simplified to the extent that the "directional arrows" 210, 230 are dispensed with or that use is only made of a "turning arrow", which indicates a required rotation in the opposite direction.

The sequence of preferred focusing is described below on the basis of the images illustrated in FIGS. 3A to 3E. Here, it should be considered to be particularly advantageous that the focusing sequence corresponds to the intuitive, iterative sequence which a user would also use in the case of a visible camera image. Here, the focus ring is moved beyond the region of maximum sharpness in each step, with the extent of said region being further refined in each step, i.e. the threshold from which the image is identified as being "sharp" increases. As a result, the movements on the wheel become smaller and slower with each step, until the latter is only moved minimally about the point of maximum sharpness. Means for determining a focus value for example use a gradient calculation on the input image (see respective partial FIG. 1 of FIGS. 3A-3E), with the sum over the absolute values of the gradients being used for the analysis. By way of example, a focus identification system as described in WO 2008/063811 A1, in which a sharpness value is converted into a waveform, can be used within the scope of the invention.

Figure 3A:
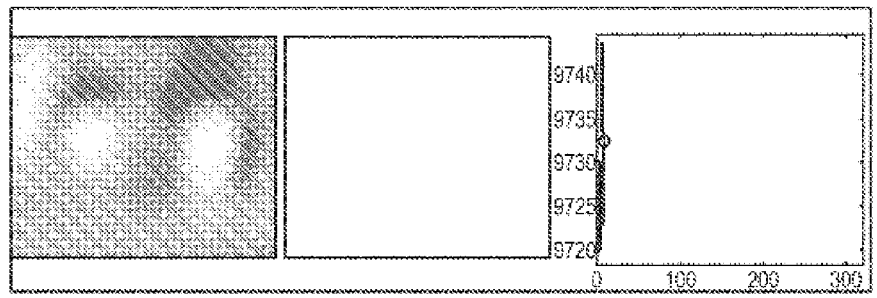
FIGS. 3A to 3E show steps during focusing in accordance with a particularly preferred embodiment of the invention.

FIG. 3A shows a situation in which a focus setting mechanism is at the left-hand stop. The user has to bring about such a setting e.g. at the beginning of the installation or the camera automatically initiates such a position. By way of example, the installation process for focusing can be started by means of a physical switch on the camera or per software command to the camera. The control indicator in this state corresponds to the indication state 202 in FIG. 2. Partial FIG. 1 in FIG. 3A illustrates the (blurred) camera image obtained in this state. Partial FIG. 2 shows a gradient image, in which the edges, which occur in partial FIG. 1, are realized accordingly. As a result of the blurring in the obtained image, no edges can be detected. Partial FIG. 3 plots the sum of the gradient contributions from the edge image 2 on a y-axis over time or at a corresponding scanning time on the x-axis, as a result of which a quality factor for the sharpness for each setting time is obtained.

Figure 3B:
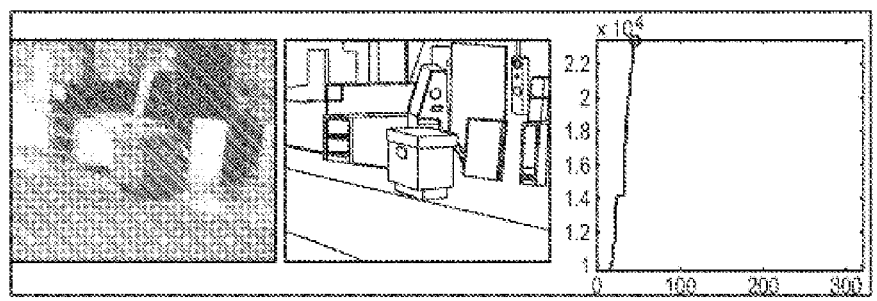

In FIG. 3B, the focusing wheel was rotated to the right by a user as a result of the indication state 202 from FIG. 2. The quality factor for the sharpness, as illustrated in partial FIG. 3, increases since edges are partly detected in the edge image 2. The method continuously calculates the degree of sharpness and analyzes the corresponding curve profile. To the extent that a maximum value is not exceeded, the indicator from FIG. 2 remains in the indication state 202.

Figure 3C:
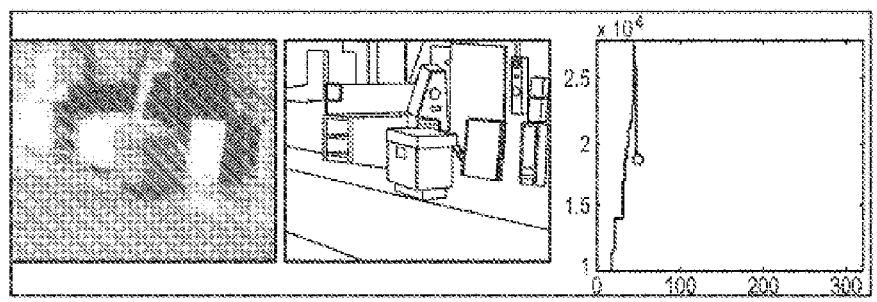

In FIG. 3C, the lens was rotated beyond a maximum sharpness, which can be identified in partial FIG. 3, as a result of the means for indicating the focusing information being in indication state 202, due to which the sharpness of the camera image 1 and, accordingly, the gradient image 2 deteriorates. If such a state is reached, the means for indicating the focusing information switch to an indication state 203, which signals that a focus wheel should be moved into an opposite direction, i.e. to the left in this case. On the basis of the maximum value obtained hereby, a first rough threshold of the sharpness is set (e.g. ¾ of the maximum). If the focus measure is above this threshold region, the indicator lights up in the indication state 204.

The user now has to rotate the focus wheel until the indicator goes out again and the sign for the opposite rotation (indication state 202) lights up. In the meantime, an algorithm once again determines the maximum sharpness. As a result of the now slower rotation and the increased sampling rate per rotational angle accompanying this, the maximum can be determined with a greater accuracy.

Figure 3D:
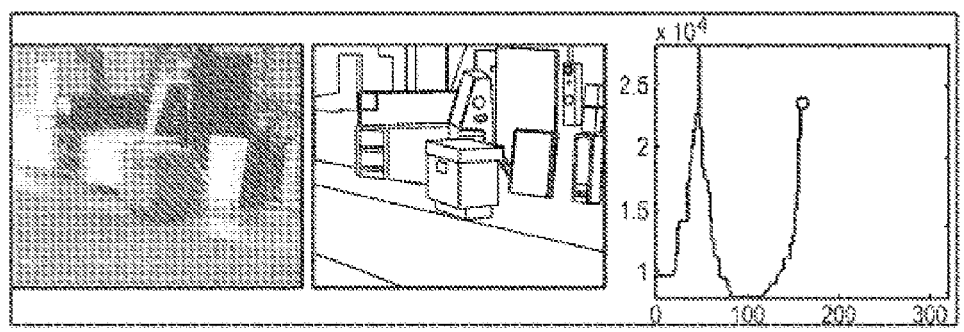
Figure 3E:
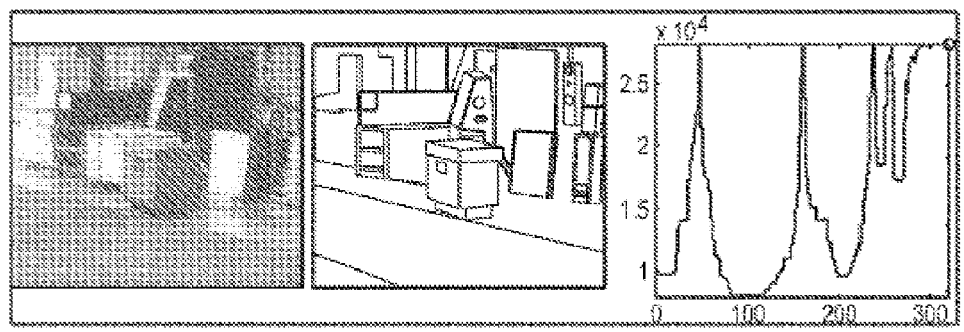

The method illustrated in partial FIGS. 3C and 3D is now repeated continuously. In doing so, the threshold is automatically displaced further toward the respectively found maximum every time the maximum region is exceeded, as a result of which the rotational-angle region in which the maximum indicator (indication state 204) lights up is continuously made smaller. This forces the user to apply the rotation with ever-increasing precision. The method is finished when the maximum region has become so small that even very small movements on the wheel are sufficient to let the indicator (indication state 204) go out (illustrated overall in FIG. 3E).

In conclusion, it is possible to determine that the measures according to the invention allow a simplified installation of a camera without the necessity of an image reproduction. An installer can identify directly on the camera (e.g. by means of a light-emitting diode) when the latter is optimally set. As a result, it is possible to tune the camera, e.g. on a ladder at a relatively large distance, without having to appraise e.g. a display on a notebook, which is conventionally used for setting.

As explained above, acoustic signaling can be introduced into the above-described installation process and assist or replace the latter. By way of example, this can be brought about by means of changeable pitch, sequences of sounds and/or sound intervals. By way of example, a constant sound can signal an optimum and sequences of sounds becoming faster can indicate guidance in the direction of an optimum and sequences of sounds becoming slower can indicate the departure from the optimum.

The invention claimed is:

1. A camera for providing digital image contents comprising:
   a manual focusing apparatus;
   a device for assisting focusing comprising:
      a camera processor configured to determine a focus value of the camera depending on an operation of the manual focusing apparatus; and
      an indicator for indicating to a user focusing information including displaying an initial direction for turning the manual focusing apparatus on the basis of the determined focus value.

2. A method for providing focusing information using a camera as claimed in claim 1, the method comprising: determining a focus value of a camera depending on an operation of a manual focusing apparatus and indicating to a user focusing information on the basis of the determined focus value.

3. The camera for providing digital image contents as claimed in claim 1, wherein the camera comprises a smart camera provided with a video processing unit, the smart camera configured to record and to interpret images.

4. The camera for providing digital image contents as claimed in claim 3, wherein the manual focusing apparatus comprises a manual focusing wheel, and the indicator displaying a direction for turning the manual focusing apparatus comprises selectively displaying an arrow indicating a direction for turning the focusing wheel.

5. The camera for providing digital image contents as claimed in claim 3, further comprising:
   an iris-diaphragm setting mechanism; and
   a setting apparatus for focal length.

6. The camera for providing digital image contents as claimed in claim 3, wherein the camera processor comprises a microprocessor that implements image processing routines.

7. A camera for providing digital image contents, comprising:
   a manual focusing wheel;
   a processor configured to determine a focus value of the camera depending on an operation of the manual focusing wheel and to determine an edge strength of edges in the digital contents; and
   an indicator configured to indicate a direction for turning the manual focusing wheel on the basis of the determined focus value, and to indicate when the focus value passes at least one threshold.

8. The camera as claimed in claim 7, wherein the indicator is configured to indicate the direction for turning with an arrow, and wherein the indicator is configured to visually indicate when a sharpness value has been reached so that turning of the manual focusing wheel is no longer desired.

9. The camera as claimed in claim 8, wherein the indicator comprises light-emitting diodes.

10. The camera for providing digital image contents as claimed in claim 8, wherein the camera comprises a fixedly mounted smart camera configured to record images and filter out and process application-specific information from recorded images and make decisions based thereon.

11. The camera for providing digital image contents as claimed in claim 10, wherein the processor comprises a camera processor.

12. The camera for providing digital image contents as claimed in claim 1, wherein the camera comprises a fixedly mounted smart camera, and wherein the camera processor is configured to record images and filter out and process application-specific information from recorded images and make decisions based thereon.

* * * * *